Patented Sept. 6, 1938

2,128,902

UNITED STATES PATENT OFFICE 2,128,902

ARALKYL ETHERS OF HYDROXY BENZOATES

Shailer L. Bass, Midland, Mich., and Edward M. Van Duzee, deceased, late of Midland, Mich., by Clarence H. Macomber, administrator, Midland, Mich., assignors to The Dow Chemical Company, Midland, Mich., a corporation of Michigan No Drawing. Application August 27, 1937, Serial No. 161,285

9 Claims. (Cl. 260—474)

The present invention concerns a new class of compounds, namely, the aralkyl ethers of the hydroxy benzoic acid esters and such derivatives thereof as contain aryl, alkyl, or halogen substituents in the hydroxylated benzene ring.

Certain of the above compounds have been prepared, and the physical properties thereof determined whereby they may be readily identified. These compounds are particularly useful as intermediates for the manufacture of pharmaceuticals and plasticizing agents for cellulose derivatives such as ethyl cellulose. The invention, then, lies in the new products hereinafter fully described and particularly pointed out in the claims.

The new compound can be prepared by treating the alkali metal salt of a hydroxy benzoic acid aryl ester compound directly with an aralkyl halide.

For example, a hydroxy benzoic acid aryl ester compound, e. g. phenyl salicylate, is added to a solution produced by digesting metallic sodium in alcohol, thereby producing an alcoholic solution of the sodium salt of the said hydroxy benzoate. An aralkyl halide is then introduced slowly into said sodium oxy-benzoate solution maintained at its refluxing temperature, to form the desired ether product. The reaction mixture is then cooled and diluted with several volumes of water to precipitate therefrom a crude ether product, which may thereafter be separated in any convenient manner, e. g. by extraction with an organic solvent, decantation, etc. The crude product so obtained is washed with water and purified, as by distillation or fractional crystallization, to obtain the desired ether in substantially pure form.

These new compounds may also be obtained by (1) reacting a hydroxy benzoic acid aryl ester compound with an aralkyl halide in the presence of an aqueous or aqueous alcoholic solution of sodium hydroxide, or other suitable alkali, (2) by esterifying an aralkyl ether of a hydroxy-benzoic acid with a hydroxy-aryl compound, or (3) by reacting upon the alkali metal salt of an aralkyl ether of a hydroxy benzoic acid with a suitable aryl halide.

The following examples describe in detail the preparation of certain specific members of the new class of compounds, but are offered only to illustrate the invention, and are not to be construed as limiting the same.

Example 1

7.1 grams (0.308 mol.) of metallic sodium was digested with 200 milliliters of absolute alcohol, 100 grams (0.308 mol.) of 4-chloro-2-phenyl-phenyl ester of salicylic acid reacted with the resulting alcoholic solution to form an alcoholic solution of the sodium salt of said hydroxy benzoic acid ester. This solution was warmed to its refluxing temperature and 39 grams (0.308 mol.) of benzyl chloride added thereto over a period of one hour. Refluxing was continued thereafter for one hour at atmospheric pressure, after which the reaction mixture was cooled and diluted with approximately 3 volumes of water. A dark oil separated out of the aqueous alcoholic suspension and was extracted with benzene, washed with water to remove suspended chlorides, filtered, and the benzene removed by distillation at atmospheric pressure. The dark viscous liquid obtained thereby was fractionally distilled under reduced pressure, whereby there was obtained 44.5 grams (0.108 mol.) of the benzyl ether of the 4-chloro-2-phenyl-phenyl ester of salicylic acid as a substantially odorless, waterwhite, viscous liquid boiling at 176°–182° C. at 3 millimeters pressure, and having the specific gravity 1.208 at 20°/4° C.

Example 2

40 molar quantities each of metallic sodium, phenyl salicylate, and benzyl chloride were reacted together in 24 liters of alcohol, substantially as described in Example 1. Fractional distillation of the crude reaction product resulted in the isolation of 3031 grams (9.96 mols) of the benzyl ether of phenyl salicylate as a substantially odorless, viscous, yellow-tinged liquid boiling at 174°–179° C. at 3 millimeters pressure and having the specific gravity 1.135 at 20°/4° C.

In a similar manner, other aralkyl ethers of hydroxy-benzoic acid aryl ester compounds were prepared. The following table lists the physical characteristics of various representative members of this class.

Table

| Benzyl ether of— | Boiling point | Freezing point | Melting point | Specific gravity at 20°/4° C. | Form |
|---|---|---|---|---|---|
| | | ° C. | ° C. | | |
| 4-phenyl-phenyl ester of salicylic acid | | | 130–2 | | White, crystalline solid. |
| 4-cyclohexyl-phenyl ester of salicylic acid | | | 85–6 | | Do. |
| 2-phenyl-4-bromo-phenyl ester of salicylic acid | 215–219° C. at 3 mm | 46 | | | Do. |
| 2-phenyl-6-chloro-phenyl ester of salicylic acid | 203–208° C. at 3 mm | 40.3 | | | Do. |
| 2-phenyl-phenyl ester of salicylic acid | 189–191° C. at 3 mm | | | 1.137 | Water-white liquid. |
| 2-methyl-5-isopropyl-phenyl ester of salicylic acid | 175–179° C. at 2 mm | | | 1.128 | Straw-colored liquid. |

Among other aralkyl ethers of the hydroxy-substituted benzoic acid aryl esters which may be prepared according to the above-described procedures are compounds of the hydroxy benzoic acids in which the hydroxylated benzene group contains hydrocarbon and halogen substituents, and in which the etherifying and esterifying groups differ from those shown in the examples. For example, by substituting other aralkyl halides and hydroxy-benzoic acid aryl ester compounds for those previously shown compounds are prepared such as benzyl ether of the phenyl ester of 3-methyl salicylic acid, i. e. benzyl ether of phenyl-ortho-cresotinate, 4-chloro-benzyl ether of phenyl salicylate, 2-bromo-phenyl-ethyl ether of the phenyl ester of 3-phenyl-salicylic acid, 2-bromo-4-phenyl-phenyl-ethyl-ether of alpha-naphthyl salicylate, phenyl-amyl-ether of 2,4-dichloro-phenyl ester of 5-chloro-salicylic acid, 2,4-dichloro-benzyl ether of the phenyl ester of 4-hydroxy-benzoic acid, phenyl-octyl ether of the 2-phenyl-phenyl ester of 3,5-dichloro-4-hydroxy-benzoic acid, 4-bromo-benzyl ether of the 2-methoxy-phenyl ester of 4-hydroxy-benzoic acid, phenyl-hexyl-ether of the 4-tertiary-butyl-phenyl ester of 3-bromo-4-hydroxy-benzoic acid, phenyl-propyl ether of the 2-aceto-phenyl ester of 3-methyl-4-hydroxy-benzoic acid, 3-chloro-phenyl-ethyl ether of phenyl 3-hydroxy-benzoate, 3-chloro-benzyl ether of alpha-naphthyl 3-hydroxy-benzoate, phenyl-butyl-ether of the 4-chloro-phenyl ester of 3-hydroxy-benzoic acid, etc. Aralkyl bromides may be substituted for aralkyl chlorides shown in the examples; and in place of the sodium salts reacted therewith, other alcohol substituted metallo hydroxy derivatives may be employed, e. g. the potassium compounds, etc.

Among the compounds to which this invention particularly relates are those having the following formula

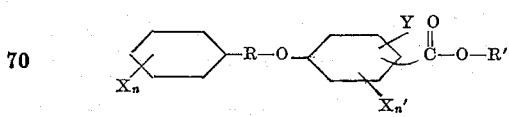

wherein X and X' each represent hydrogen or halogen, each n is an integer not greater than 2, R is an alkylene group, R' is an aryl radical, and Y represents an alkyl or aryl radical or hydrogen.

The present application is a continuation in part of our prior filed copending application Serial Number 97,188.

Other modes of applying the principle of the invention may be employed instead of those explained, change being made as regards the materials employed provided the products described in the following claims be thereby obtained.

We therefore particularly point out and distinctly claim as the invention:—

1. An aralkyl ether of a hydroxy-benzoic acid ester compound having the formula

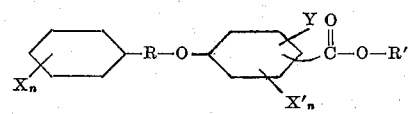

wherein X and X' each represent a member of the class consisting of hydrogen and halogen, each n is an integer not greater than 2, R is an alkylene group, R' is an aryl radical, and Y represents a member of the group consisting of the alkyl and aryl radicals and hydrogen.

2. An aralkyl ether of a hydroxy benzoic acid ester compound having the formula

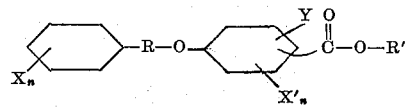

wherein X and X' each represent a member selected from the class consisting of hydrogen and halogen, each n is an integer not greater than 2, R is an alkylene group containing from 1 to 8 carbon atoms, inclusive, R' is an aryl radical, and Y represents a member of the group consisting of the alkyl and aryl radicals and hydrogen.

3. A benzyl ether of a hydroxy benzoic acid ester compound having the formula

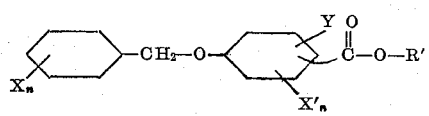

wherein X and X' each represent a member of the class consisting of hydrogen and halogen, each n is an integer not greater than 2, R' is an aryl radical, and Y represents a member of the group consisting of the alkyl and aryl radicals and hydrogen.

4. An aralkyl ether of an aryl salicylate having the formula

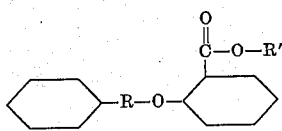

wherein R is an alkylene group containing from 1 to 8 carbon atoms, inclusive, and R' is an aryl radical.

5. A benzyl ether of an aryl salicylate having the formula

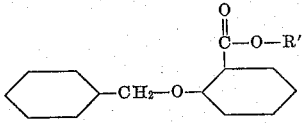

wherein R' is an aryl radical.

6. A benzyl ether of an aryl salicylate having the formula

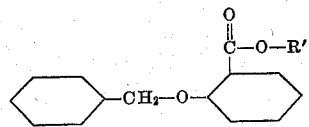

wherein R' is a diphenyl group.

7. Benzyl ether of phenyl-salicylate.
8. Benzyl ether of the 2-phenyl-phenyl ester of salicyclic acid.
9. Benzyl ether of the 2-methyl-5-isopropyl-phenyl ester of salicylic acid.

SHAILER L. BASS.
CLARENCE H. MACOMBER,
*Administrator of Estate of Edward M. Van Duzee, Deceased.*